US012142839B2

(12) United States Patent
Wen et al.

(10) Patent No.: US 12,142,839 B2
(45) Date of Patent: Nov. 12, 2024

(54) BASE STATION ANTENNAS HAVING PARASITIC ELEMENTS

(71) Applicant: Outdoor Wireless Networks LLC, Claremont, NC (US)

(72) Inventors: Hangsheng Wen, Suzhou (CN); Xiaotuo Wang, Suzhou (CN); Xun Zhang, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 186 days.

(21) Appl. No.: 17/855,918

(22) Filed: Jul. 1, 2022

(65) Prior Publication Data

US 2023/0022274 A1 Jan. 26, 2023

(30) Foreign Application Priority Data

Jul. 21, 2021 (CN) ......................... 202110823743.9

(51) Int. Cl.

| | |
|---|---|
| ***H01Q 1/24*** | (2006.01) |
| ***H01Q 1/52*** | (2006.01) |
| ***H01Q 19/10*** | (2006.01) |
| ***H01Q 21/26*** | (2006.01) |

(52) U.S. Cl.

CPC ............. *H01Q 21/26* (2013.01); *H01Q 1/246* (2013.01); *H01Q 1/526* (2013.01); *H01Q 19/10* (2013.01)

(58) Field of Classification Search

CPC .......... H01Q 1/24; H01Q 1/246; H01Q 1/523; H01Q 21/00; H01Q 21/062; H01Q 21/26; H01Q 25/001; H01Q 19/10

See application file for complete search history.

(56) References Cited

U.S. PATENT DOCUMENTS

| | | | | |
|---|---|---|---|---|
| 6,734,829 | B1 | 5/2004 | Goettl | |
| 10,916,842 | B2 | 2/2021 | Ai et al. | |
| 11,258,157 | B2 | 2/2022 | Ai | |
| 2018/0131078 | A1* | 5/2018 | Shooshtari | H01Q 1/246 |
| 2020/0136247 | A1* | 4/2020 | Ai | H01Q 1/523 |
| 2020/0303836 | A1* | 9/2020 | Li | H01Q 21/245 |

FOREIGN PATENT DOCUMENTS

| | | |
|---|---|---|
| DE | 19931907 C2 | 8/2001 |
| GB | 2171257 A | 8/1986 |

OTHER PUBLICATIONS

"Extended European Search Report for European Application No. 22185940.8, dated Nov. 21, 2022, 13 pages".

* cited by examiner

*Primary Examiner* — Thai Pham

(74) *Attorney, Agent, or Firm* — Myers Bigel, P.A.

(57) ABSTRACT

A base station antenna comprises a reflector, a plurality of first radiating elements arranged in a first column that extends in a vertical direction, a plurality of second radiating element arranged in a second column that extends in the vertical direction, and a plurality of parasitic elements, where the parasitic elements are arranged around the first radiating elements and/or second radiating elements. Each parasitic element is configured as a rod-shaped metal part, where a longitudinal axis of the rod-shaped metal part extends at an angle of between 70° to 110° with respect to a plane defined by the reflector, and the parasitic elements are positioned in front of the reflector in and are electrically floating with respect to the reflector.

21 Claims, 5 Drawing Sheets

(c) AZ= 47 °

(d) AZ= 47 °

BASE STATION ANTENNAS HAVING PARASITIC ELEMENTS

CROSS-REFERENCE TO RELATED APPLICATION

The present application claims priority to Chinese Patent Application No. 202110823743.9, filed Jul. 21, 2021, the entire content of which is incorporated herein by reference as if set forth fully herein.

FIELD

The present disclosure generally relates to radio communications and more particularly, to base station antennas for cellular communications systems.

BACKGROUND

An array that includes a plurality of closely spaced radiating element columns, for example, columns of +/−45° cross dipole radiating elements that are configured for beamforming, are mounted in some base station antennas such as beamforming base station antennas. Such arrays tend to have good cross-polarization performance parameters, for example, cross-polar discrimination, at small horizontal (i.e., azimuth plane) scanning angles, for example, a horizontal scanning angle close to 0°, but have poorer cross-polarization performance parameters at larger horizontal scanning angles, for example, a horizontal scanning angle close to 47°.

In order to improve cross-polarization performance parameters of the base station antenna at large horizontal scanning angles, in a solution of the prior art as shown in FIG. 1, parasitic elements 230' extending in a vertical direction V are usually used. Herein, a horizontal direction H corresponds to a row direction of the radiating elements in the array and the vertical direction V corresponds to the column direction of the radiating elements in the array. If the base station antenna is mounted for use without any downtilt in the elevation plane, the horizontal direction will be parallel to a plane defined by the horizon and the vertical direction will intersect the plane defined by the horizon at a right angle.

SUMMARY

According to a first aspect of the present disclosure, a base station antenna is provided; the base station antenna comprises: a reflector; a plurality of first radiating elements arranged in a first column that extends in a vertical direction, where the first radiating elements extend in a forward direction from the reflector; a plurality of second radiating element arranged in a second column that extends in the vertical direction, where the second radiating elements extend in the forward direction from the reflector; and a plurality of parasitic elements, where the parasitic elements are arranged around the first radiating elements and/or second radiating elements; wherein, each parasitic element is configured as a rod-shaped metal part or comprises a rod-shaped metal body, where a longitudinal axis of the rod-shaped metal part or a longitudinal axis of the rod-shaped metal body extends at an angle of between 70° to 110° with respect to a plane defined by the reflector, and the parasitic elements are positioned in front of the reflector in and are electrically floating with respect to the reflector.

In some embodiments, the longitudinal axis of the rod-shaped metal part or the longitudinal axis of the rod-shaped metal body basically extends perpendicularly to a plane defined by the reflector.

According to a second aspect of the present disclosure, a base station antenna is provided; the base station antenna comprises: a reflector; a plurality of first radiating elements arranged in a first column extending in a vertical direction, where the first radiating elements extend in a forward direction from the reflector; a plurality of second radiating elements arranged in a second column extending in the vertical direction, where the second radiating elements extend in the forward direction from the reflector and the first and second radiating elements in the first column and the second column define a plurality of pairs of horizontally aligned radiating elements; and a plurality of parasitic elements, where each parasitic element is positioned between a respective one of the pairs of horizontally-aligned radiating elements, wherein, each parasitic element is configured as a rod-shaped metal part or comprises a rod-shaped metal body, where a longitudinal axis of the rod-shaped metal part or a longitudinal axis of the rod-shaped metal body extends at an angle of between 70° to 110° with respect to a plane defined by the reflector; and wherein, the parasitic elements are positioned to improve peak cross-polar discrimination by at least 2 dB at a horizontal scanning angle larger than a first angle without having peak cross-polar discrimination worsen by more than 1 dB at a horizontal scanning angle smaller than a second angle.

The base station antenna according to some embodiments of the present disclosure is capable of improving cross-polarization performance parameters, for example, cross-polar discrimination, at a large horizontal scanning angle and is capable of maintaining originally good cross-polarization performance parameters at a small horizontal scanning angle, or is capable of targetedly improving cross-polar discrimination at a small horizontal scanning angle. In addition, locating parasitic elements of the base station antenna in front of the reflector in a form of being electrically floated with the reflector according to some embodiments of the present disclosure has limited effects on current distribution of the base station antenna.

DETAILED DESCRIPTION

Figure 1:
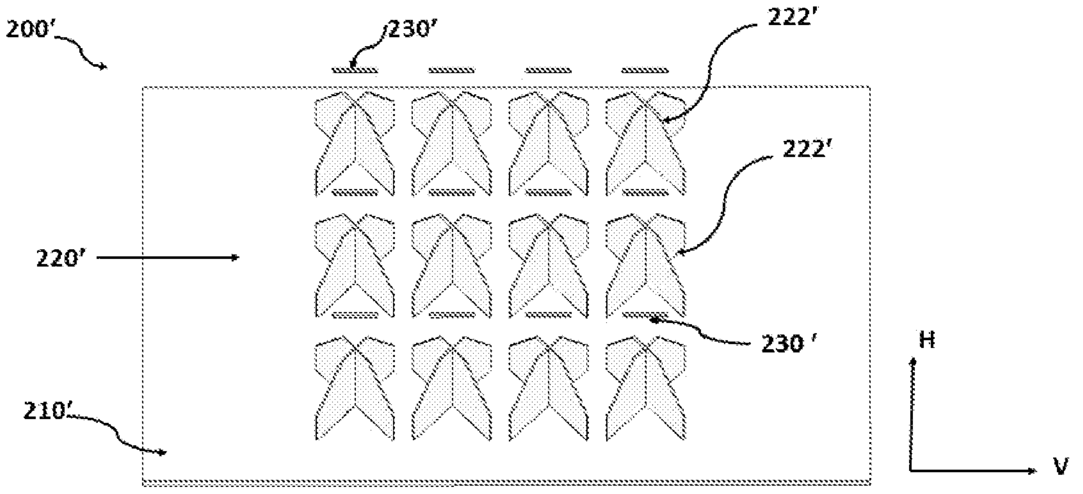
FIG. 1 is a schematic diagram of a base station antenna according to the prior art, where parasitic elements extending in a vertical direction V are mounted forwardly of the reflector of the base station antenna.
Figure 2:
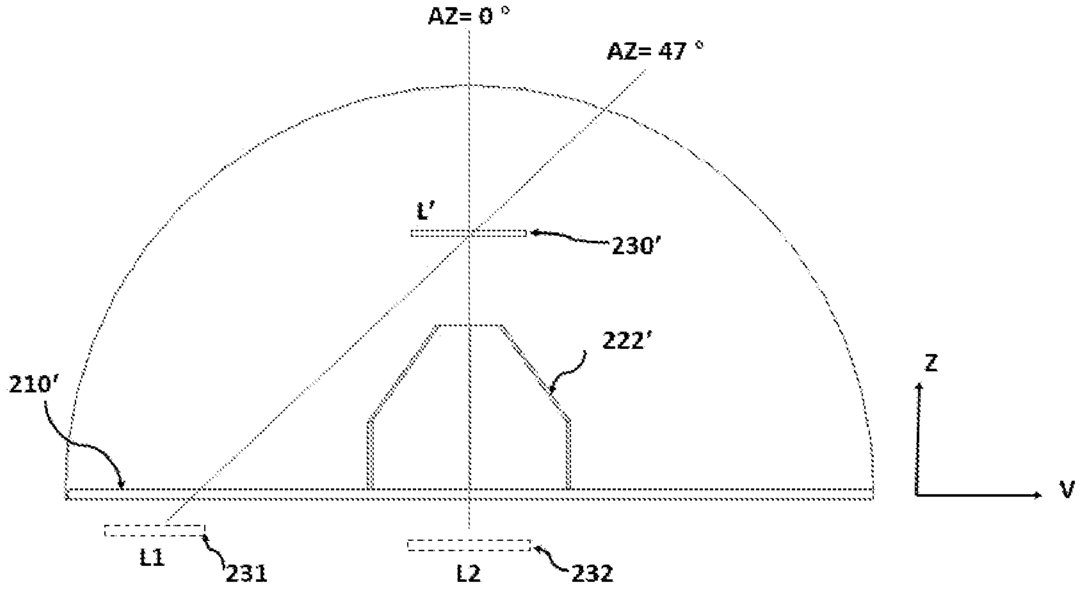
FIG. 2 is a schematic diagram of equivalent active length of parasitic elements of the base station antenna in FIG. 1 at a small horizontal scanning angle and a large horizontal scanning angle, respectively.

FIG. 1 is a schematic diagram of a base station antenna 200' according to the prior art. FIG. 2 is a schematic diagram of equivalent active length of parasitic elements of the base station antenna of FIG. 1 at a small horizontal scanning angle and a large horizontal scanning angle, respectively.

As shown in FIG. 1, the base station antenna 200' may comprise a reflector 210' and a plurality of columns 220' of radiating elements 222'. The radiating elements 222' are mounted to extend forwardly of the reflector 210'. Radiating elements 222', for example, may be configured as +/−45° cross dipole radiating elements as shown in FIG. 1. Such radiating elements 222' basically have equal horizontal radiation component and vertical radiation component at small horizontal scanning angles AZ, for example, a horizontal scanning angle AZ of 0°. In other words, it basically has balanced horizontal and vertical radiation components. Therefore, the base station antenna 200' has good cross-polarization performance parameters, for example, cross-polar discrimination, at small horizontal scanning angles AZ. However, at large horizontal scanning angles AZ, for example, a horizontal scanning angle AZ of 47°, the horizontal and vertical radiation components of radiating elements 222' may change and may no longer be balanced. Therefore, as compared to a small horizontal scanning angle AZ, the base station antenna 200 has poorer cross-polarization performance parameters, for example, cross-polar discrimination, at a large horizontal scanning angle AZ.

In order to balance the radiation components of radiating elements 222' at a large horizontal scanning angle AZ and thereby improve the cross-polarization performance parameters, the base station antenna 200', as shown in FIG. 1, includes metallic rod-shaped parasitic elements 230' that extend in a vertical direction V that are installed around the radiating elements 222'. Such metallic rod-shaped parasitic elements may also be referred to herein as parasitic pins. The working principle of parasitic elements 230' is described in further detail with reference to FIG. 2. As shown in FIG. 2, at a large horizontal scanning angle AZ (AZ=47° in this example), the parasitic element 230' has a first equivalent active length L1 in a vertical direction. The first equivalent active length L1 may be understood as the length of a first projection 231 of the parasitic element 230' at a large horizontal scanning angle AZ on a base level (for example, the reflector). Similarly, at a small horizontal scanning angle AZ (AZ=0° in this example), parasitic element 230' is provided with a second equivalent active length L2 in the vertical direction V. The parasitic element 230' is capable of changing the radiation components of the radiating element 222 at a large horizontal scanning angle AZ to make the radiation components of the radiating element 222 more balanced, thereby improving the cross-polarization performance parameters of the base station antenna 200' at a large horizontal scanning angle AZ. However, at a small horizontal scanning angle AZ, based on its first equivalent active length L1, the parasitic element 230' also changes the radiation components of the radiating element 222' with basically the same method. This causes originally balanced radiation components of the radiating element 222' at small horizontal scanning angles AZ to possibly be imbalanced and may cause the originally good cross-polar discrimination of the base station antenna 200' at small horizontal scanning angles AZ to become worse. In other words, such base station antenna 200' is unable to obtain good cross-polar discrimination at both a large horizontal scanning angle AZ and a small horizontal scanning angle AZ.

In order to overcome the above drawback in the prior art, the present disclosure provides a new base station antenna 200. A plurality of parasitic elements 240 are installed in the base station antenna 200 of the present disclosure and the parasitic elements may be configured as rod-shaped metal parts or elongated metal parts. Alternatively, the parasitic elements may comprise a rod-shaped metal body or an elongated metal body. In the present disclosure, "rod-shaped", or "elongated" should be understood as a dimension on a longitudinal axis of the rod-shaped metal part or rod-shaped metal body being larger, for example, 5 times or even 10 times larger than its transverse dimension, for example, transverse diameter. The longitudinal axis of the rod-shaped metal part or longitudinal axis of the rod-shaped metal body basically extends in a forward direction Z perpendicular to a plane defined by the reflector 210.

In this way, the cross-polarization performance parameters, for example, cross-polar discrimination, of the base station antenna 200 at a large horizontal scanning angle AZ may be improved and the originally good cross-polarization performance parameters of the base station antenna 200 at a small horizontal scanning angle AZ may also be maintained. This shall be described below in further detail with reference to FIG. 3 to FIG. 5.

Figure 3:
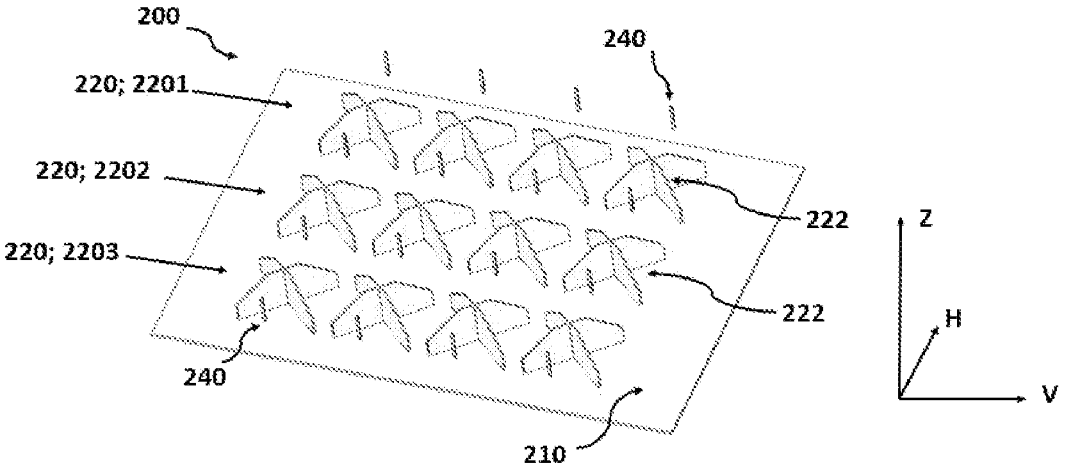
FIG. 3 is a schematic diagram of a base station antenna according to some embodiments of the present disclosure, where parasitic elements extending in a forward direction Z are mounted forwardly of the reflector of the base station antenna.
Figure 4:
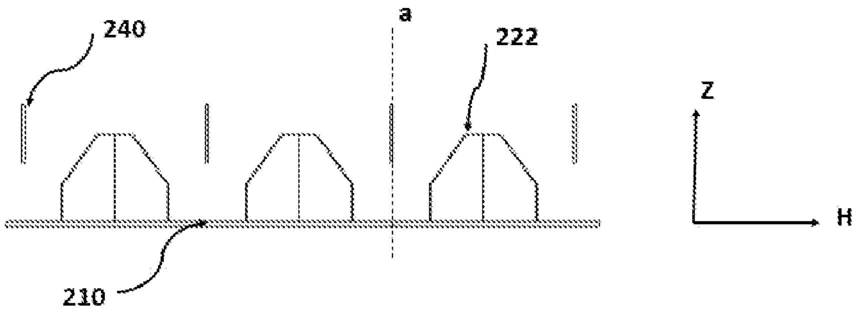
FIG. 4 is a schematic side view of the base station antenna in FIG. 3.
Figure 5:
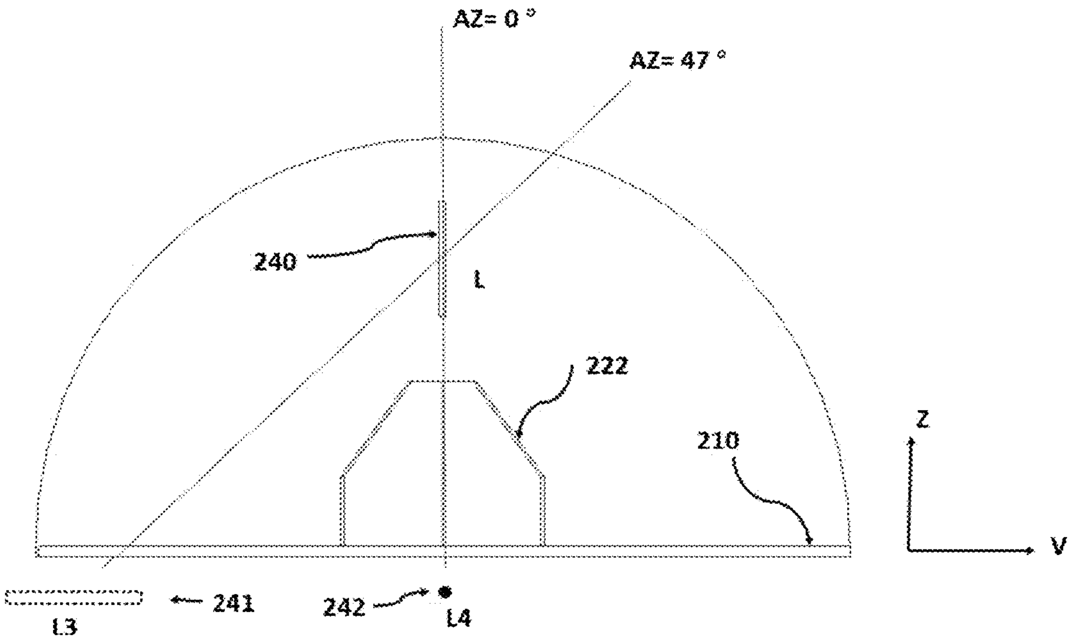
FIG. 5 is a schematic diagram of equivalent active length of parasitic elements of a base station antenna according to some embodiments of the present disclosure at a small horizontal scanning angle and a large horizontal scanning angle, respectively.

FIG. 3 is a schematic diagram of a base station antenna according to some embodiments of the present disclosure. FIG. 4 is a schematic side view of the base station antenna in FIG. 3. FIG. 5 is a schematic diagram of equivalent active lengths of a parasitic element of a base station antenna according to some embodiments of the present disclosure at a small horizontal scanning angle and a large horizontal scanning angle, respectively.

The base station antenna 200 in the various embodiments of the present disclosure, for example, may be a beamforming antenna. As shown in FIG. 3, the base station antenna 200 may comprise a reflector 210 and an array that comprises a plurality of columns 220 of radiating elements 222. The reflector 210 may be used as a ground plane for the radiating elements 222. The radiating elements 222 are mounted to extend in a forward direction Z from the reflector 210. Each radiating element 222 may be a high-band radiating element, a mid-band radiating element, or a low-band radiating element. The low-band radiating element may be configured to operate, for example, in the 617 MHz to 960 MHz frequency range or one or more partial ranges thereof. The mid-band radiating element may be configured to operate, for example, in the 1427 MHz to 2690 MHz frequency range or one or more partial ranges thereof. The high-band radiating element may be configured to operate, for example, in the 3 GHz to 5 GHz frequency range or one or more partial ranges thereof.

In the embodiment of FIG. 3, the base station antenna 200 may comprise a plurality of (three in this example) vertically extending radiating element 222 columns 220. A first radiating element column 2201 comprises a plurality of (four in this example) first radiating elements arranged in a vertical direction; a second radiating element column 2202 comprises a plurality of (four in this example) second radiating elements arranged in a vertical direction; a third radiating element column 2203 comprises a plurality of (four in this example) third radiating elements arranged in a vertical direction. The radiating elements 222 in the first radiating element column 2201, the second radiating element column 2202 and the third radiating element column 2203 define a plurality of pairs of horizontally aligned radiating elements 222. Here, it should be understood that the antenna assembly 200 may comprise any number of vertically arranged radiating element 222 columns 220, and each radiating element 222 column 220 may comprise any number of vertically arranged radiating elements 222. Radiating elements 222, for example, may be configured as +/−45° cross dipole radiating elements as shown in FIG. 3, or configured as radiating elements with a rectangular or square contour, which are not shown.

As shown in FIG. 3, the base station antenna 200 of the present disclosure is provided with a plurality of parasitic elements 240. Each parasitic element 240 may be configured as a rod-shaped metal part, or comprise a rod-shaped metal body. The length L of the parasitic elements 240 along the longitudinal axis a of the parasitic element 240, for example, may be set as a positive integer multiple of one-quarter of the corresponding center frequency wavelength of the operating frequency band of each radiating element 222. In other words, the pre-determined length of the rod-shaped metal part or rod-shaped metal body may extend in a forward direction from the end close to the reflector, where the pre-determined length may be within the wavelength range of 0.1 to 0.5, a wavelength range of 0.15 to 0.4, or close to a wavelength of 0.25. In other words, a length of each parasitic element is within a wavelength range of 0.1 to 0.5, a wavelength range of 0.15 to 0.4, or close to a wavelength of 0.25. In some embodiments, as shown in FIG. 5, the parasitic element 240 may extend further forward than the radiating element 222 from the reflector 210. In some embodiments, the parasitic elements 240 are spaced apart from the reflector 210, so that the parasitic elements 240 are adjacent to respective radiating arms of the radiating elements 222.

Continuing to refer to FIG. 3, the parasitic elements 240 may be arranged around each radiating element 222. The parasitic elements 240, for example, may be arranged in a horizontal direction H between adjacent radiating elements 222. In some embodiments, the parasitic elements 240 may also be arranged at other locations in the base station antenna 200. For example, they may be arranged in a vertical direction V between adjacent radiating elements 222 and/or arranged around the outside of the radiating element 222 columns.

It can be clearly seen in FIG. 5 that the parasitic element 240 may be configured as a rod-shaped metal part, where the longitudinal axis a of the rod-shaped metal part basically extends perpendicularly to the plane defined by the reflector 210. In the present disclosure, "basically perpendicularly" may be understood as the longitudinal axis a of the parasitic element 240 extending at an angle of between 70 to 110° (90° in this example) against the plane defined by the reflector 210. In this case, as shown in FIG. 5, at a large horizontal scanning angle AZ (AZ=47° in this example), the parasitic element 240 is provided with a third equivalent active length L3 in a vertical direction V. Therefore, the parasitic elements 240 of the present disclosure are similarly capable of improving the cross-polarization performance parameters, for example, cross-polar discrimination, of the base station antenna 200 at a large horizontal scanning angle AZ. However, at a small horizontal scanning angle AZ (AZ=0°) in this example, the parasitic elements 240 of the present disclosure are provided with a fourth equivalent active length L4 in a vertical direction V. As compared to the actual length L of the parasitic elements, the fourth equivalent active length L4 is shortened. As shown in FIG. 5, when AZ=0°, the fourth equivalent active length L4 is shortened to be a point. Here, the "point" may be understood as a cross-section of the parasitic element in FIG. 5. As compared to the length L or third equivalent active length L3 of the parasitic element, the fourth equivalent active length L4 is very small (it can be understood to be approximately 0 in this example). Therefore, such parasitic element 240 has very limited effects, and almost no effect, on the radiation components of the radiating element 222 at a small horizontal scanning angle AZ. Therefore, different from parasitic elements 230' in the prior art, the parasitic elements 240 of the present disclosure are capable of better maintaining the originally balanced radiation components of radiating elements 222 at a small horizontal scanning angle AZ, thereby maintaining originally good cross-polarization performance parameters, for example, cross-polar discrimination. Therefore, the base station antenna 200 of the present disclosure is capable of achieving good cross-polarization performance parameters at a large horizontal scanning angle AZ and also at a small horizontal scanning angle AZ.

In some cases, for example, when radiating elements 222 have slightly imbalanced radiation components at a small horizontal scanning angle AZ, in order to change and balance the radiation components of radiating elements 222 at a small horizontal scanning angle AZ, the longitudinal axis a of parasitic elements 240 may extend at an inclination angle against the plane defined by the reflector 210. The inclined angle, for example, may be a range of angles from 70 to 110°, but this should not be understood as limiting the present disclosure. In this case, at a small horizontal scanning angle AZ, parasitic elements 240 may be provided with a fifth equivalent active length. The fifth equivalent active length may be between the second equivalent active length L2 and fourth equivalent active length L4, and may be changed by adjusting the above inclination angle according to actual needs. In this way, the parasitic elements 240 of the present disclosure are capable of targetedly changing the radiation components of radiating elements 222 at a small horizontal scanning angle AZ according to actual needs, thereby improving the cross-polarization performance parameters of radiating elements 222 at a small horizontal scanning angle AZ.

In some alternative embodiments, the parasitic elements 240 may also be configured as a L-shaped or T-shaped purely metallic components which comprise a rod-shaped metal body and a connecting section basically perpendicularly connected to the rod-shaped metal body, and the connecting section may be indirectly connected to the reflector by means of a dielectric element. The connecting section may be provided with a sixth equivalent active length at a small horizontal scanning angle AZ. The sixth equivalent active length may be adjusted by changing the length of the connecting section according to actual needs. Therefore, the L-shaped or T-shaped parasitic elements 240 are similarly capable of targetedly changing the radiation components of radiating elements 222 at a small horizontal scanning angle AZ, and are capable of improving the cross-polarization performance parameters of radiating elements 222 at a small horizontal scanning angle AZ.

In addition, to minimize the effects of current distribution on the reflector, the parasitic elements 240 are positioned in front of the reflector 210 and are electrically floating with respect to the reflector. In the present disclosure, "electrical suspension" may be understood as "having no galvanic connection between the parasitic elements 240 and reflector". As such, the parasitic elements 240 basically act as a separate electric field component, making the current distribution of the parasitic elements 240 purer.

In order to mount the parasitic elements 240 in front of the reflector 210 in a form of being electrically floating with respect to the reflector. As shown in FIG. 4, the parasitic elements 240 may be arranged to be spaced apart from the reflector 210. For this purpose, the parasitic elements 240 may be fixed onto the reflector 210 with a dielectric element, thereby preventing galvanic connection between the parasitic elements 240 and the reflector 210. When the parasitic elements 240 are configured as separate rod-shaped metal parts, the end of the rod-shaped metal parts facing the reflector may be indirectly connected to the reflector 210 with a dielectric element. When the parasitic elements 240 are configured as L-shaped or T-shaped purely metallic components as described above, the connecting section of the L-shaped or T-shaped purely metallic components may be indirectly connected to the reflector 210 with a dielectric element. The dielectric element may be connected to the parasitic elements 240 and reflector 210 through various suitable connection methods, for example, bonding, plugging, snap-fitting, soldering, or rivet connection. In addition, the dielectric element may also be configured as a plug-in medium in a slot housed on the reflector 210, and the parasitic elements 240 may be directly shape-fitted to and plugged into the medium.

Figure 6:
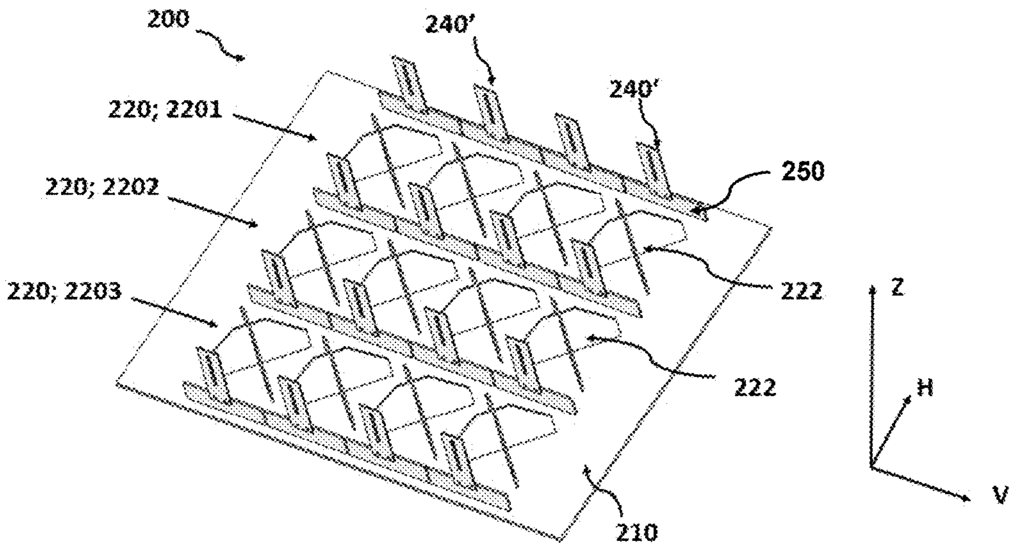
FIG. 6 is a schematic diagram of a base station antenna according to some embodiments of the present disclosure, where fence elements extending in a vertical direction V are mounted on the base station antenna and parasitic elements extending in a forward direction Z are mounted on the fence elements.

FIG. 6 is a schematic perspective view of a base station antenna 200 according to some embodiments of the present disclosure. In order to reduce coupling interference between adjacent radiating elements 222, in some embodiments of the present disclosure, apart from parasitic elements 240', a plurality of vertically extending fence elements 250 may be additionally mounted onto the reflector 210. Each fence element 250 may be a metallic element extending in a forward direction from the reflector 210 and mounted on the reflector 210. Arranging fence elements 250 around the radiating elements 222 can reduce the coupling interference of corresponding radiating elements 222, thereby further improving the radiation pattern of the base station antenna 200 and further improving the cross-polarization performance parameters of the base station antenna 200. The fence elements 250 shown in FIG. 6 are arranged in a horizontal direction H between adjacent radiating elements 222. It should be understood that the number and arrangement of the fence elements 250 may also be changed according to actual needs. For example, the antenna assembly 200 may further comprise a plurality of fence elements 250 extending in a horizontal direction H and the fence elements 250 are respectively arranged in a vertical direction between adjacent radiating elements 222.

In the embodiment shown in FIG. 6, in order to mount the parasitic elements 240' in front of the reflector 210 so that they are electrically floating with respect to the reflector, the parasitic elements 240' may be mounted on the fence elements 250 with a dielectric element, for example, a PCB substrate, and indirectly fixed onto the reflector 210. The PCB substrate may be fixed on the fence elements 250 by, for example, a rivet connection. However, it may be conceived that the PCB substrate in FIG. 6 is not fixed onto the fence elements 250 but directly mounted on the reflector and extends in a forward direction from the reflector. Here, the PCB substrate may be plugged into the corresponding groove of the reflector 210. In addition, the PCB substrate may also be mounted on a L-shaped plastic contact pin and indirectly fixed on the reflector 210.

In the embodiment in FIG. 6, the parasitic elements 240' may be printed on the PCB substrate as printed traces, for example, on a first main surface and/or a second main surface of the PCB substrate. Printed traces acting as parasitic elements may be centrally printed on the PCB substrate and extend forwards a pre-determined length, for example, one quarter of a wavelength of corresponding to the center frequency of the operating frequency band of the radiating elements 222, from the end close to the reflector.

Figure 7A:
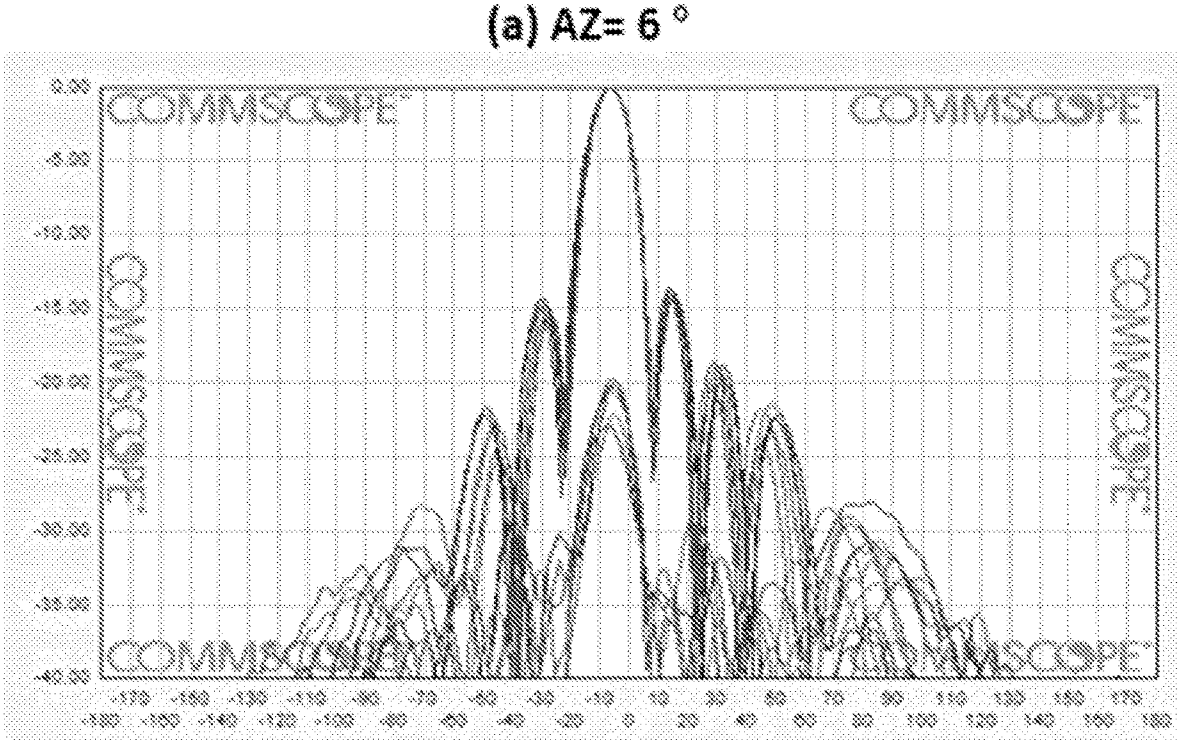
FIGS. 7*a*-7*d* are a series of graphs depicting azimuth plane radiation patterns of a base station antenna before and after installing parasitic elements at horizontal scanning angles of 6° and 47°.
Figure 7B:
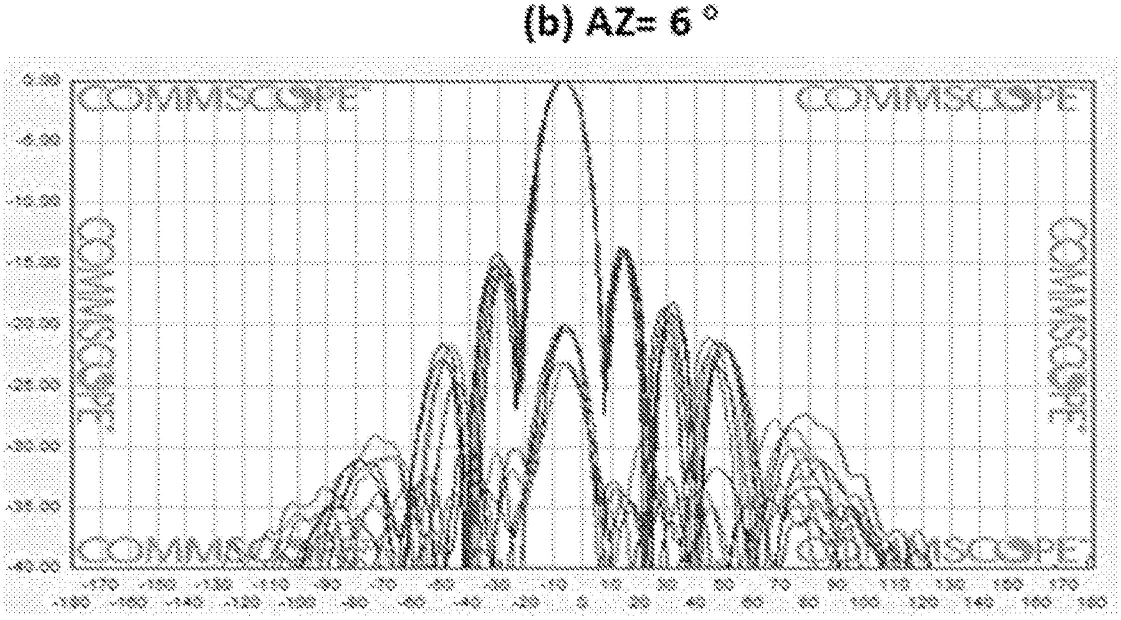
Figure 7C:
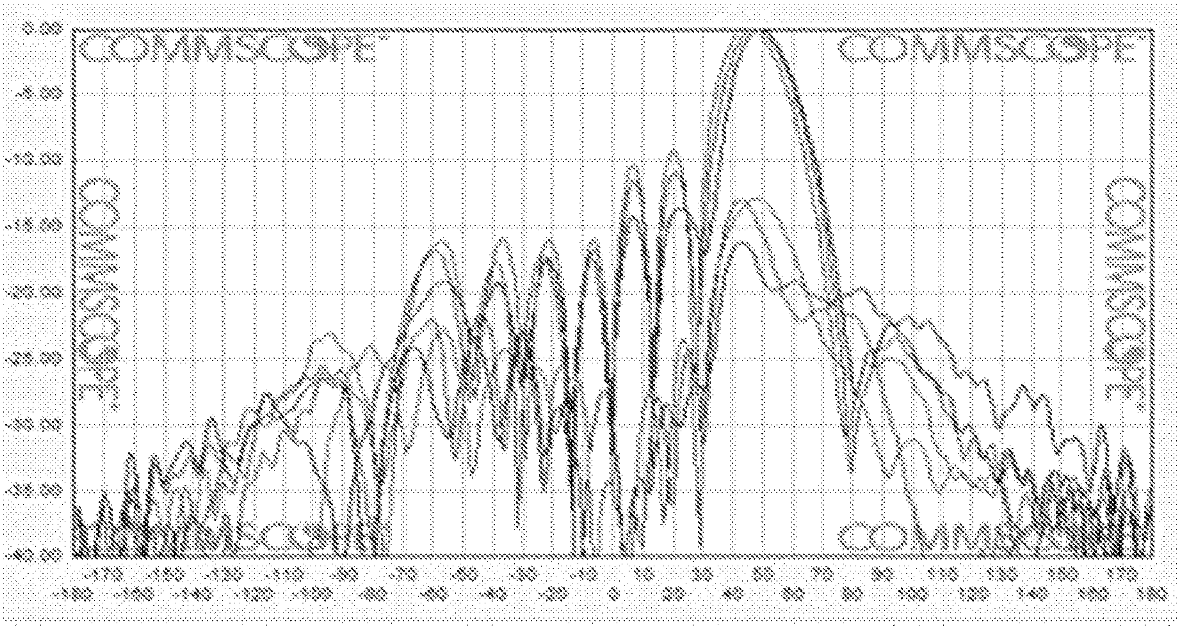
Figure 7D:
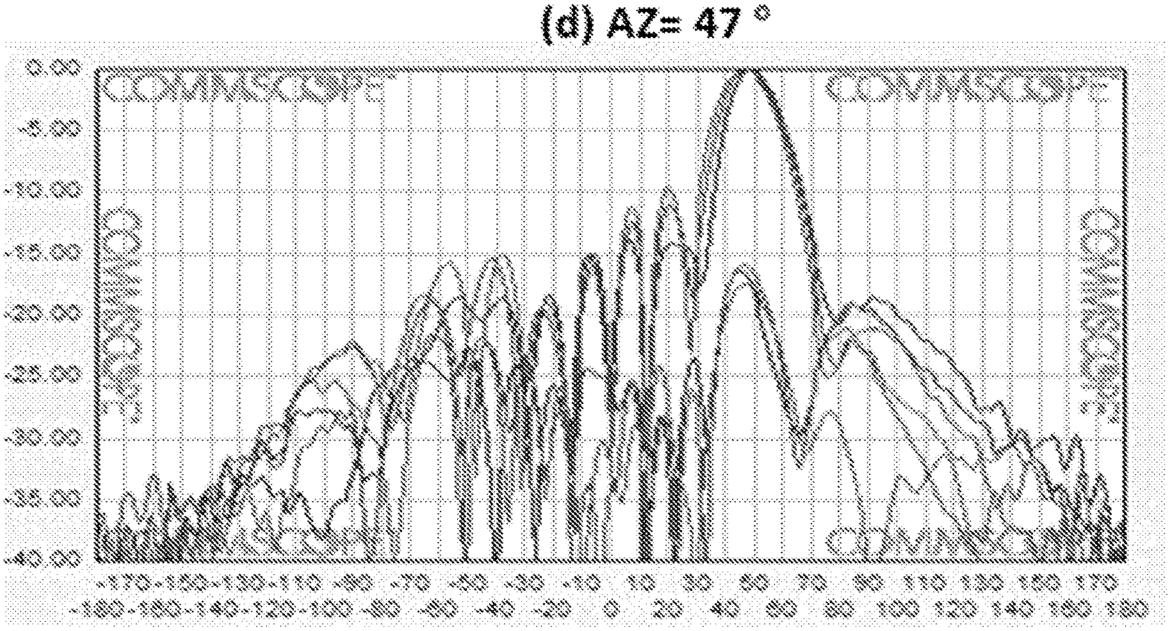

FIGS. 7*a*-7*d* show radiation patterns of a base station antenna 200 before and after installing parasitic elements 240 at horizontal scanning angles AZ of 6° and 47°, in which, FIG. 7*a* shows a radiation pattern of the base station antenna 200 before installing parasitic elements 240 at a horizontal scanning angle AZ of 6°; FIG. 7*b* shows a radiation pattern of the base station antenna 200 after installing parasitic elements 240 at a horizontal scanning angle AZ of 6°; FIG. 7*c* shows a radiation pattern of the base station antenna 200 before installing parasitic elements 240 at a horizontal scanning angle AZ of 47°; FIG. 7*d* shows a radiation pattern of the base station antenna 200 after installing parasitic elements 240 at a horizontal scanning angle AZ of 47°. It can be clearly seen from FIGS. 7*a*-7*d* that the base station antenna 200 according to the present disclosure is capable of improving the peak cross-polar discrimination at a large horizontal scanning angle AZ (AZ=47° in this example) by at least 2 dB (3 dB in this example) without causing the peak cross-polar discrimination at a small horizontal scanning angle AZ (AZ=6°) to drop by more than 1 dB (this is basically unchanged in this example). Therefore, it can be seen that the base station antenna 200 according to the present disclosure is capable of improving cross-polar discrimination at a large horizontal scanning angle AZ and is also capable of maintaining originally good cross-polar discrimination at a small horizontal scanning angle AZ.

The base station antenna 200 according to the present disclosure can bring one or more of the following advantages: first, the base station antenna 200 according to the present disclosure is capable of improving cross-polarization performance parameters, for example, cross-polar discrimination, at a large horizontal scanning angle AZ and is capable of maintaining originally good cross-polarization performance parameters, for example, cross-polar discrimination, at a small horizontal scanning angle AZ relatively as well; second, the parasitic elements 240 are positioned in front of the reflector so as to be electrically floating with respect to the reflector, and hence have almost no effect on the current distribution on the reflector or are hardly affected by the reflector; third, the parasitic elements 240 are capable of targetedly changing the radiation components of radiating elements 222 at a small horizontal scanning angle AZ according to actual needs, thereby improving the cross-polarization performance parameters of radiating elements 222 at a small horizontal scanning angle AZ.

Although exemplary embodiments of the present disclosure have been described, those skilled in the art should understand that many variations and modifications are possible in the exemplary embodiments without materially departing from the spirit and scope of the present disclosure. Therefore, all variations and changes are included in the protection scope of the present disclosure defined by the claims. The present disclosure is defined by the attached claims, and equivalents of these claims are also included.

That which is claimed is:

1. A base station antenna, comprising:

a reflector;

a plurality of first radiating elements arranged in a first column that extends in a vertical direction, where the first radiating elements extend in a forward direction from the reflector;

a plurality of second radiating elements arranged in a second column that extends in the vertical direction, where the second radiating elements extend in the forward direction from the reflector; and a plurality of parasitic elements, where the parasitic elements are arranged around the first radiating elements and the second radiating elements, wherein each of the parasitic elements comprises a rod-shaped metal part, where a longitudinal axis of the rod-shaped metal part extends at an inclination angle in a range from 70° to 110° with respect to a plane defined by the reflector, and the parasitic elements are positioned in front of the reflector and are electrically floating with respect to the reflector.

2. The base station antenna according to claim 1, wherein the parasitic elements are spaced apart from the reflector.

3. The base station antenna according to claim 1, wherein at least some of the parasitic elements are arranged between respective pairs of horizontally adjacent first radiating elements and second radiating elements.

4. The base station antenna according to claim 1, wherein at least some of the parasitic elements are fixed onto the reflector by respective dielectric elements.

5. The base station antenna according to claim 4, wherein the dielectric elements are printed circuit board ("PCB") substrates and the parasitic elements are printed on the respective PCB substrates as respective printed traces.

6. The base station antenna according to claim 5, wherein the printed traces are printed on the respective PCB substrates in the forward direction.

7. The base station antenna according to claim 5, wherein the PCB substrates are directly mounted on the reflector and extend in the forward direction from the reflector.

8. The base station antenna according to claim 1, further comprising a plurality of fence elements extending in the vertical direction, where the fence elements extend in the forward direction from the reflector and are mounted on the reflector, the fence elements are arranged around the first radiating elements and the second radiating elements.

9. The base station antenna according to claim 8, wherein the fence elements are arranged between horizontally adjacent first radiating elements and second radiating elements.

10. The base station antenna according to claim 8, wherein the parasitic elements are mounted on respective ones of the fence elements with a dielectric element and indirectly fixed on the reflector.

11. The base station antenna according to claim 1, wherein the parasitic elements extend further forward from the reflector than the first radiating elements and second radiating elements.

12. The base station antenna according to claim 1, wherein a length of each parasitic element is within a wavelength range of 0.1 to 0.5, and the wavelength is a wavelength corresponding to a center frequency wavelength of an operating frequency band of the first radiating elements or the second radiating elements.

13. The base station antenna according to claim 12, wherein the length of each parasitic element is within a wavelength range of 0.15 to 0.4.

14. The base station antenna according to claim 1, wherein the parasitic elements are configured as separate rod-shaped metal parts and ends of the respective rod-shaped metal parts that face the reflector are indirectly connected to the reflector by means of one or more dielectric elements.

15. A base station antenna, comprising:

a reflector;

a plurality of first radiating elements arranged in a first column extending in a vertical direction, where the first radiating elements extend in a forward direction from the reflector;

a plurality of second radiating elements arranged in a second column extending in the vertical direction, where the second radiating elements extend in the forward direction from the reflector and the first and second radiating elements in the first column and the second column define a plurality of pairs of horizontally aligned radiating elements; and a plurality of parasitic elements, where each of the parasitic elements is positioned between a respective one of the pairs of horizontally aligned radiating elements, wherein each of the parasitic elements is configured as an elongated metal part, and wherein the parasitic elements are configured to improve peak cross-polar discrimination by at least 2 dB at a horizontal scanning angle larger than a first angle without having peak cross-polar discrimination worsen by more than 1 dB at a horizontal scanning angle smaller than a second angle, wherein the first angle is between 41°-53° and the second angle is between 00-12°.

16. The base station antenna according to claim 15, wherein at the horizontal scanning angle larger than the first angle, the peak cross-polar discrimination is improved by at least 3 dB.

17. The base station antenna according to claim 15, wherein at the horizontal scanning angle smaller than the second angle, the peak cross-polar discrimination is substantially unchanged.

18. The base station antenna according to claim 15, wherein a longitudinal axis of the elongated metal part extends at an angle of between 70° to 110° with respect to a plane defined by the reflector.

19. The base station antenna according to claim 15, wherein a longitudinal axis of the elongated metal part extends perpendicularly to a plane defined by the reflector.

20. The base station antenna according to claim 15, wherein at a horizontal scanning angle of the second angle, an equivalent active length of the parasitic elements in the vertical direction is shortened as compared to an actual length of the parasitic elements.

21. The base station antenna according to claim 15, wherein when the second angle is 0°, an equivalent active length of the parasitic elements is shortened to be a point.

* * * * *